UNITED STATES PATENT OFFICE.

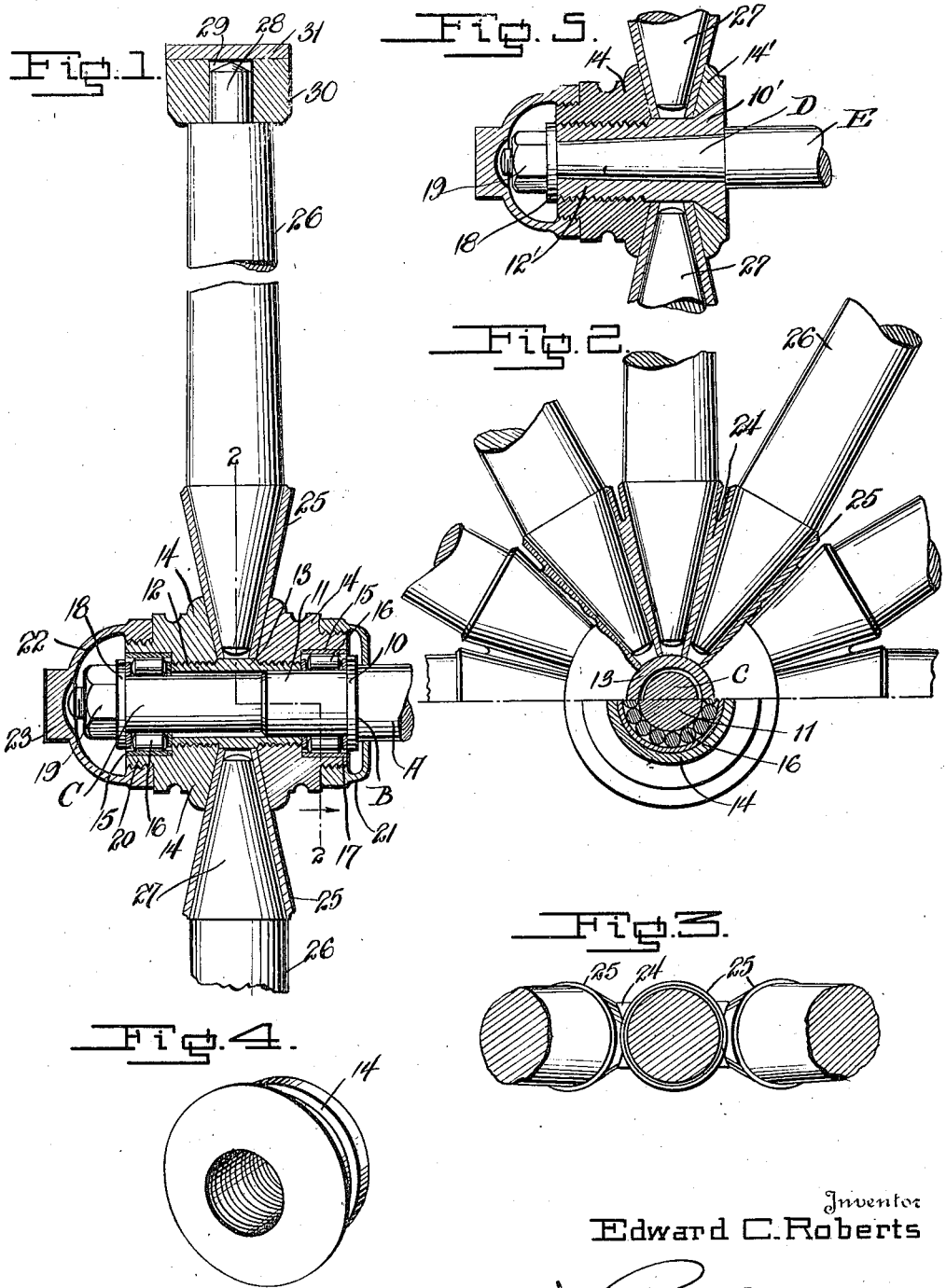

EDWARD C. ROBERTS, OF SALTVILLE, VIRGINIA.

WHEEL-HUB.

1,289,915.  Specification of Letters Patent.  Patented Dec. 31, 1918.

Application filed August 3, 1917. Serial No. 184,309.

*To all whom it may concern:*

Be it known that I, EDWARD C. ROBERTS, a citizen of the United States, residing at Saltville, in the county of Smyth and State of Virginia, have invented new and useful Improvements in Wheel-Hubs, of which the following is a specification.

The present invention relates to carrier wheels particularly of that type adapted for use on power driven vehicles.

An object of the present invention is to provide a wheel of this type which is relatively strong; which comprises relatively few parts; which may be formed from metal; which may be economically manufactured; which embodies a relatively small amount of material in its construction; and which may be readily assembled and knocked down.

The above, and various other objects and advantages of this invention will be in part described, and in part understood, from the following detailed description of the present preferred embodiment, the same being illustrated in the accompanying drawing, wherein:

Figure 1 is a fragmentary sectional view taken centrally and transversely through a wheel constructed according to the present invention.

Fig. 2 is a fragmentary sectional view taken through the central part and in the plane of the wheel on the line 2—2 of Fig. 1.

Fig. 3 is a peripheral edge portion of the improved hub with the spokes therein, the latter being shown in section.

Fig. 4 is a detail perspective view of one of the adjustable hub sections.

Fig. 5 is a fragmentary transverse section through a modified form of wheel hub, adapted particularly for use on live axles.

Referring to this drawing, A designates a dead axle which may be provided with a collar or flange 10 formed on one end of a sleeve 11 which closely fits the axle A and which preferably engages at its inner end against the shoulder B of the axle at its jointure with the spindle C.

The hub of this invention comprises a tubular inner member 12 which is elongated and adapted to fit snugly over the outer end of the sleeve 11. The tubular member 12 is externally screw threaded at opposite ends and provided intermediate its ends with an annular raised bearing or supporting rib 13.

Hub sections 14, preferably of like construction, are of annular form and internally threaded for detachable threaded engagement upon the opposite ends of the tubular member 12. The outer ends of the hub members 14 are counter-bored and have fitted therein annular race-ways 15 in the form of flat rings adapted to receive against their inner faces circular rows of roller bearings 16. The bearings 16 may be of any approved type and are held in position by retaining rings 17 located at the opposite ends of the rollers and within the counter-bores of the hub members.

The inner rollers 16 are held within the inner hub member 14 by the collar 10, and the outer rollers 16 are held in place within the outer hub member 14 by a washer 18 which is fitted against the outer end of the spindle C and retained by the usual nut 19.

To house the rollers 16 the outer ends of the hub members 14 are exteriorly reduced and threaded to form outstanding annular flanges 20 upon which are detachably threaded inner and outer cap nuts 21 and 22. The inner cap nut 21 is relatively flat, overhangs and incloses the collar 10, and has an opening therethrough to receive the axle A. The outer cap nut 22 is of dome shape and is adapted to inclose the nut 19, and is provided upon its outer closed end with an angularly faced head 23 for the reception of a wrench or the like for rotating the cap.

The hub is provided with an annular spoke supporting member 24 which is relatively flat and formed of a plurality of substantially conical spoke sockets 25, arranged in a circular row and in juxtaposed positions. The spoke supporting member 24 is thus provided with concaved opposite sides, and the intermediate axial portion of the member 24 is relatively narrow, and conforms in width substantially to that of the supporting bead 13 of the tubular member 12. The spoke supporting member fits over the bead 13, and is centered thereon by turning up the hub members 14 against the opposite sides of the member 24 to bind the latter in place.

A plurality of spokes 26 is arranged about the hub in the usual manner. The inner ends of the spokes 26 are reduced and tapered, as at 27, and are adapted to be wedged in the sockets 25. The outer ends of the spokes 26 are reduced to provide studs 28 which engage in correspondingly formed recesses 29 provided in the felly 30. A felly band or rim 31 surrounds the felly and may be provided with any approved tire attaching means.

In the modification shown in Fig. 5 the tubular member 12' has upon its inner end a conically formed collar 10' adapted to be wedged upon the tapering spindle D of the live axle E. The collar 12' is bound in position upon the spindle D by the washer 18 and nut 19. The inner hub member 14' is of substantially ring form with a conical internal bore adapted to snugly engage over the exterior conical face of the collar 10'. With this construction the outer hub member 14 advances the spoke supporting member 24 against the ring 14' and binds the parts together and upon the tubular member 12'.

It is of course understood, that various other changes and modifications may be made in the details of construction of the above specifically described embodiments, without departing from the spirit of this invention, such changes and modifications being restricted only by the scope of the following claims.

I claim:—

1. In a hub, the combination of a tubular member exteriorly threaded on opposite ends and having an intermediate annular raised bearing surface, an annular spoke member having spoke sockets and concaved lateral faces fitting over the tubular member and supported on said bearing surface, and opposed hub sections threaded on the ends of the tubular member and being adapted to be turned up against the concaved surfaces of the spoke member to maintain the latter concentric on said bearing surface.

2. In a hub, the combination of a tubular member, an annular spoke supporting member fitting over the tubular member, hub sections detachably engaging upon the opposite ends of the tubular member and adapted to be advanced against the opposite sides of the spoke supporting member to bind the latter in position and with the outer ends of the hub sections projecting beyond the ends of the tubular member, and bearings fitting in the outer ends of the hub sections for supporting the latter.

3. In a hub, the combination of a tubular member, an annular member having radially extending spoke sockets therein, hub sections detachably mounted upon the opposite ends of the tubular member and adapted to bind against the opposite sides of said annular member, bearings fitted in the outer ends of the hub sections beyond the extremities of the tubular member for supporting the hub, a collar fitting against the free ends of the inner bearings, and detachable retaining means engaging against the free ends of the outer bearings for holding the same and the hub in position.

4. In a hub, the combination of a tubular member, an annular spoke supporting member fitting over the tubular member, hub sections threaded upon the opposite ends of the tubular member and adapted to be turned up against the opposite sides of the spoke supporting member, bearings fitted in the outer ends of the hub sections, a collar engaging against the inner bearings and having a sleeve projecting into said tubular member for supporting the collar, and detachable retaining means engaging against the outer bearings to hold the same and the hub in position.

5. In a hub, the combination of a tubular member, said tubular member having externally threaded ends and an intermediate annular bearing surface, an annular spoke supporting member fitting over the tubular member, hub sections threaded upon the opposite ends of the tubular member and adapted to be turned up against the opposite sides of the spoke supporting member to center the same upon said bearing surface, bearings fitted in the outer ends of the hub sections, a sleeve fitting in the inner hub section and having a collar on its outer end adapted to engage the adjacent bearings to retain the latter in position, retaining means engaging the outer bearings to hold the latter and the hub in position, and cap nuts mounted upon the outer ends of the hub sections for housing said bearings and adjacent parts.

6. In a hub, the combination of a tubular member, an annular spoke member mounted on the tubular member, and having flaring spoke sockets and concaved lateral faces, and means carried by the tubular member engaging against the said concaved faces of the spoke member, for retaining the latter on the tubular member.

7. In a hub, the combination of a tubular member exteriorly threaded on opposite ends and having an intermediate annular raised bearing surface, an annular spoke member having spoke sockets and concaved lateral faces fitting over the tubular member and supported on said bearing surface, opposed hub sections threaded on the ends of the tubular member and adapted to be turned up against the concaved surfaces of the spoke member to maintain the latter concentric on said bearing surface, said hub sections being externally reduced and threaded and having counter bores at their outer ends beyond the ends of the tubular member, bearings fitting in the counter bores for supporting the hub at opposite ends, and caps threaded to the outer ends of the hub members and inclosing the bearings.

8. In a hub, the combination of a tubular member, having an intermediate annular bearing surface, an annular spoke member fitting the bearing surface and having flaring spoke sockets and concaved lateral faces, and means carried by the tubular member engaging against the said concaved faces of the spoke member, for retaining the same on the bearing surface of the tubular member.

EDWARD C. ROBERTS.